(12) United States Patent
Slanina et al.

(10) Patent No.: US 9,975,794 B2
(45) Date of Patent: May 22, 2018

(54) MANAGING GREYWATER FROM A MICROBIAL DECOMPOSITION PROCESS

(71) Applicant: EnviroPure Systems LLC, Travelers Rest, SC (US)

(72) Inventors: James Slanina, Greenville, SC (US); Joseph Batts, Greenville, SC (US)

(73) Assignee: ENVIROPURE SYSTEMS LLC, Travelers Rest, SC (US)

( * ) Notice: Subject to any disclaimer, the term of this patent is extended or adjusted under 35 U.S.C. 154(b) by 313 days.

(21) Appl. No.: 14/739,077

(22) Filed: Jun. 15, 2015

(65) Prior Publication Data
US 2015/0360980 A1 Dec. 17, 2015

Related U.S. Application Data

(60) Provisional application No. 62/012,662, filed on Jun. 16, 2014.

(51) Int. Cl.
*B01F 3/04* (2006.01)
*B01F 3/08* (2006.01)
(Continued)

(52) U.S. Cl.
CPC .............. *C02F 1/78* (2013.01); *B01F 3/0451* (2013.01); *B01F 3/0876* (2013.01); *C02F 3/02* (2013.01);
(Continued)

(58) Field of Classification Search
CPC ........ B01F 3/0451; B01F 3/0876; C02F 1/20; C02F 1/40; C02F 1/72; C02F 1/727; C02F 1/74; C02F 1/78; C02F 3/02; C02F 3/12; C02F 3/121; C02F 3/1215; C02F 3/1221; C02F 3/1236; C02F 3/1278; C02F 3/1284;
(Continued)

(56) References Cited

U.S. PATENT DOCUMENTS 4,029,578 A * 6/1977 Turk .................. C02F 1/78
210/760
5,180,499 A * 1/1993 Hinson .................. C02F 1/78
210/706
(Continued)

FOREIGN PATENT DOCUMENTS

WO 20090123582 10/2009

OTHER PUBLICATIONS

Notification of Transmittal of the International Search Report and the Written Opinion of the International Searching Authority for PCT/US2015/035758, dated Dec. 16, 2015, 14 pages.

*Primary Examiner* — Lucas Stelling
(74) *Attorney, Agent, or Firm* — Dority & Manning, P.A.

(57) ABSTRACT

Disclosed herein are methods and systems for treating greywater from a microbial food decomposition process. A method includes flowing, into a mixing chamber of a water treatment tank, a first volume of untreated greywater. A second volume of recirculated greywater mixed with ozone gas is flowed into the mixing chamber, and mixes with the first volume of untreated greywater to produce a third volume. The third volume of greywater is flowed into a storage tank. The method further includes diverting a first portion of the third volume out of the water treatment tank, and diverting a second portion of the third volume into a recirculation line that flows the second portion back to the mixing chamber.

8 Claims, 3 Drawing Sheets

(51) Int. Cl.
  *C02F 1/78* (2006.01)
  *C02F 3/02* (2006.01)
  *C05F 17/00* (2006.01)
  *C02F 103/32* (2006.01)
  *C02F 103/00* (2006.01)

(52) U.S. Cl.
  CPC .... *C05F 17/0018* (2013.01); *C02F 2103/002* (2013.01); *C02F 2103/32* (2013.01); *C02F 2201/002* (2013.01); *C02F 2201/784* (2013.01); *C02F 2301/026* (2013.01); *C02F 2301/043* (2013.01); *C02F 2301/046* (2013.01); *Y02W 10/15* (2015.05); *Y02W 30/43* (2015.05)

(58) Field of Classification Search
  CPC .............................. C02F 3/1289; C02F 3/1294; C02F 2103/002; C02F 2103/32; C02F 2201/002; C02F 2201/784; C02F 2301/026; C02F 2301/043; C02F 2301/046; C05F 17/0018; Y02W 10/15; Y02W 30/43; B01J 19/006
  See application file for complete search history.

(56) References Cited

U.S. PATENT DOCUMENTS

| | | | |
|---|---|---|---|
| 6,146,521 A * | 11/2000 | Yasui | C02F 1/78 210/137 |
| 2002/0117458 A1 | 8/2002 | Puetter | |
| 2008/0000844 A1* | 1/2008 | Ralph | C02F 1/72 210/760 |
| 2008/0078719 A1* | 4/2008 | Fabiyi | C02F 3/1221 210/626 |
| 2010/0243580 A1 | 9/2010 | Lobban | |
| 2012/0261320 A1* | 10/2012 | Slanina | B09B 5/00 210/173 |

* cited by examiner

MANAGING GREYWATER FROM A MICROBIAL DECOMPOSITION PROCESS

CROSS-REFERENCE TO RELATED APPLICATION

This application claims the benefit of priority of U.S. Provisional Patent Application Ser. No. 62/012,662, filed Jun. 16, 2014, which is hereby incorporated by reference herein in its entirety.

TECHNICAL FIELD

The present disclosure relates to a system and method for managing greywater, and, in particular, a self-contained system for treating greywater from a microbial food decomposition process.

BACKGROUND

Food waste can be collected, liquefied, and exposed to dissolved oxygen to initiate an aerobic microbial decomposition process similar to composting that disassembles the food waste and converts it into cellular mass, energy, water, and carbon dioxide. While the residual greywater (or "greywater") from the microbial digestion process is cleaner than the food slurry from which it originated, residual water quality is still a concern. Specifically, residual biochemical oxygen demand and chemical oxygen demand (BOD/COD), suspended solids, and oxygen levels make it difficult to directly reuse the greywater in the digestion process without eventually developing concentrations that are toxic to the process and too elevated to be discharged to the sewer in some municipalities.

BRIEF DESCRIPTION OF THE DRAWINGS

The above and other features of the present disclosure, their nature, and various advantages will become more apparent upon consideration of the following detailed description, taken in conjunction with the accompanying drawings, in which.

DETAILED DESCRIPTION

Figure 1A:
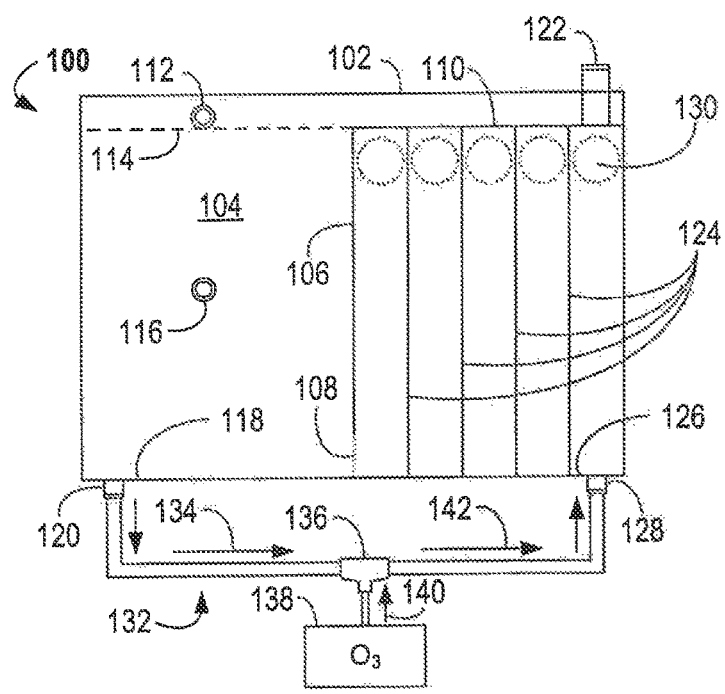
FIG. 1A is a front view of a greywater treatment tank according to an implementation.

Disclosed herein are systems and methods for cleaning and managing greywater from a microbial food decomposition process. In order to allow for greywater recycling in the aerobic digestion process, the methods and systems disclosed herein can be used to clean the greywater using ozone gas and make it available to other devices or locations for which the cleaned greywater can be used (e.g., a grinding apparatus). As disclosed herein, a water treatment tank may be utilized in a self-contained greywater cleaning system, which may be advantageous as it may serve as the point of discharge for any superfluous water brought in by the food waste, as well as ensure that discharge is significantly below any regulatory requirements.

In one aspect, a method for treating greywater includes flowing, into a mixing chamber of a water treatment tank, a first volume of untreated greywater. A second volume of recirculated greywater, which is mixed with ozone gas, is flowed into the mixing chamber, and the first and second volumes of greywater combine to produce a third volume of ozone-treated greywater. The third volume of ozone-treated water is flowed into a storage tank of the water treatment tank. The method further includes diverting a first portion of the third volume of ozone-treated greywater out of the water treatment tank, and diverting a second portion of the third volume of ozone-treated greywater into a recirculation line. The recirculation line is configured to flow the second portion of the third volume of ozone-treated greywater into the mixing chamber.

In one implementation, an ozone gas flow may be flowed into the recirculation line. The second volume of recirculated greywater may flow into the mixing chamber from the recirculation line, and mix with the ozone gas upon contact between the ozone gas flow and the second volume of recirculated greywater. The second portion of the third volume of ozone-treated greywater may be contacted by the ozone gas flow, for example, after entering the recirculation line.

In one implementation, producing the third volume of ozone-treated water includes introducing the first volume of untreated greywater and the second volume of recirculated greywater into a serpentine flow-path within the mixing chamber to produce a turbulent flow, in which the turbulent flow causes the ozone gas to dissolve.

In one implementation, diverting the first portion of the third volume of ozone-treated greywater out of the water treatment tank includes diverting the first portion of the third volume of ozone-treated greywater to a grinding apparatus.

In one implementation, the greywater is a byproduct of an aerobic food waste digester.

In one implementation, a flow rate of the recirculation line is between about 40 gallons per minute (gpm) and about 80 gpm, or is about 60 gpm.

In one aspect, a water treatment tank includes a storage chamber and a mixing chamber fluidly coupled to the storage chamber. The mixing chamber includes a first inlet disposed on a top surface of the mixing chamber, and a second inlet disposed on a bottom surface of the mixing chamber. The first inlet is configured to receive greywater from an aerobic food waste digester, and the second inlet is configured to receive recirculated greywater from the storage chamber.

In one implementation, the first outlet is disposed along an interior sidewall of the storage chamber. The first outlet may be configured to flow fluid stored in the storage chamber outside of the water treatment tank. For example, the first outlet may be fluidly coupled to a grinding apparatus.

In one implementation, a second outlet is disposed along a bottom surface of the storage chamber. The second outlet may be fluidly coupled to the second inlet via a recirculation line. The recirculation line may include a venturi injector configured to introduce a flow of ozone gas into the recirculation line.

In one implementation, the mixing chamber includes a central dividing wall disposed between the top surface and the bottom surface. The central dividing wall may divide the mixing chamber into two volumes. The mixing chamber also includes a plurality of baffle panels, each of the plurality of baffle panels bisecting the central dividing wall. The central dividing wall may include a plurality of openings. The plurality of openings together with the plurality of baffle panels may define a serpentine flow path within the mixing chamber.

In one implementation, the water treatment tank includes a plurality of weep holes disposed along the top surface of the mixing chamber.

In one implementation, the water treatment tank includes an overflow drain disposed along a sidewall of the storage chamber. The overflow drain may define a maximum volume fill line of the storage chamber. The top surface of the mixing chamber may substantially coincide with the fill line of the storage chamber.

In one aspect, a water treatment system includes a water treatment tank in accordance with any of the disclosed implementations. The system also includes an aerobic food digester fluidly coupled to the first inlet of the mixing chamber of the water treatment tank, and an ozone gas source fluidly coupled to the second inlet of the mixing chamber of the water treatment tank.

In yet another aspect, any system described herein may perform any method described herein.

Figure 1B:
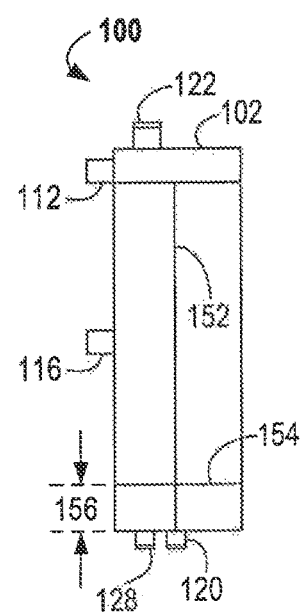
FIG. 1B is a side view of a greywater treatment tank according to an implementation.
Figure 1C:
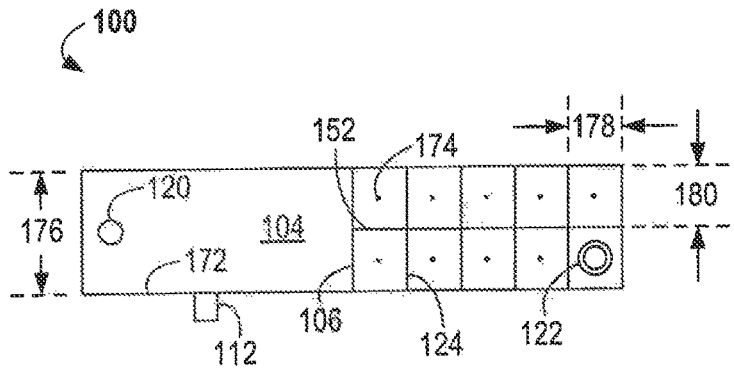
FIG. 1C is a top cross-sectional view of a greywater treatment tank according to an implementation.

FIGS. 1A, 1B, and 1C are front, side, and top cross-sectional views, respectively, of a water treatment tank 100 according to an implementation. In some implementations, the water treatment tank 100 may be shaped as a rectangular prism that is tall, deep, and thin, and may be constructed from stainless steel. However, other shapes and materials may be used to construct the water treatment tank 100. Referring to FIG. 1A, the water treatment tank 100 includes a top surface 102, which may be removable. In one implementation, the water treatment tank 100 contains two chambers: a storage chamber 104 that serves as a reservoir for storing a supply of water in its volume, and a mixing chamber 106 where incoming greywater is mixed with ozone gas (as will be discussed in greater detail below). The storage chamber 104 and the mixing chamber 106 are fluidly coupled by a port 108, which allows a fluid volume inside of the mixing chamber 106 to flow out into the storage chamber 104 after mixing has occurred. The storage chamber 104 and the mixing chamber 106 are both depicted as being integrally formed chambers within the water treatment tank 100. However, this depiction is illustrative, as certain implementations may utilize one mixing chamber and/or one or more storage chamber as standalone chambers that are fluidly coupled to each other.

In some implementations (e.g., as depicted in FIGS. 1A-C), the mixing chamber 106 is shaped as a rectangular prism having a top exterior surface 110. The top exterior surface 110 may substantially coincide with a fill line 114 of a maximum fluid volume contained in the storage chamber 104. The fill line 114 is defined by an overflow outlet 112 is disposed along a sidewall 172 of the storage chamber 104 (as illustrated in FIG. 1C), so that fluid will drain out of the storage chamber 104 via the overflow outlet 112 if the maximum volume of the storage chamber 104 is exceeded. The storage chamber 104 also includes a feed outlet 116 that may be fluidly coupled to another device used in the food decomposition process (e.g., a grinding apparatus that utilizes greywater for grinding solids), to a waste reservoir (e.g., a sewer), or to any other suitable location for which greywater may be utilized or stored. In some implementations, a pump may be fluidly coupled to the feed outlet 116 to divert a stored volume of fluid out of the storage chamber 104. In some implementations, fluid within the storage chamber 104 may flow out based on gravity (e.g., as the fill line increases above the feed outlet 116). In some implementations, the water treatment tank 100 may be a sealed chamber having an overhead gas pressure that may be increased or decreased to control a rate at which fluid flows out of the feed outlet 116. For example, the feed outlet 116 may be used to purge the storage chamber 104 if the fluid volume is near capacity, and the overflow outlet 112 may be removed and/or replaced with an overhead gas line to maintain the overhead gas pressure. In some implementations, the feed outlet 116 may be in a different location than depicted in FIGS. 1A-C, and may be disposed along a bottom surface 118 of the storage chamber 104 or any other interior sidewalls of the storage chamber 104.

A recirculation outlet 120 is disposed on the bottom surface 118, and is fluidly coupled to a recirculation line 132 that recirculates fluid from the storage chamber 104 into the mixing chamber 106 via a recirculation inlet 128 disposed on a bottom surface 126 of the mixing chamber 106. For example, the recirculation inlet may be about 1 inch in diameter. The recirculation line 132 includes a pump (not shown) for inducing a fluid flow 134 from the storage chamber 104. In some implementations, a flow rate is between about 40 gallons/minute (gpm) and about 80 gpm. In some implementations, the flow rate is about 60 gpm. However, other flow rates may be used.

The recirculation line 132 includes an injector 136, such as a venturi injector, that is fluidly connected to an ozone ($O_3$) gas source 138. An ozone gas flow 140 is injected into the fluid flow 134 to produce a mixed flow 142, which then enters the mixing chamber 106 via the recirculation inlet 128 (which may be, for example, 1 inch to 3 inches in diameter). The ozone gas source 138 may be any suitable ozone source, such as an ozone generator capable of producing dry ozone from air. The ozone gas source 138 may be capable of providing the ozone gas flow at a suitable rate for treating the greywater, such as about 1 gram per hour to about 50 grams per hour. In one implementation, the ozone gas is injected at a rate of about 10 grams per hour. In some implementations, additional flow paths may be included in the recirculation line 132. For example, a three-way valve may be included upstream from the injector 136, which may be used to divert fluid flow to a separate chamber or device (e.g., a grinding apparatus).

Untreated greywater that drains out of an aerobic digester may flow into the mixing chamber 106 through a receiving inlet 122, and may be gravity fed into the mixing chamber. The mixing chamber 106 promotes mixing of ozone gas with untreated greywater by producing a turbulent flow path within the mixing chamber 106. As depicted in FIGS. 1A-C, the mixing chamber 106 includes a plurality of baffle panels 124 that are bisected by a central dividing wall 152, producing pairs of baffle panels distributed along the length of the mixing chamber 106 by a distance 178 (which may be about 5 inches to 12 inches). The bisected baffle panels 124 form a plurality of vertical columns, each having widths 180 (which may be about 5 inches to 10 inches), with each channel pair spanning a width 176 of the chamber (which may be about 10 to about 20 inches).

Adjacent columns may be fluidly coupled to each other to define a flow path. For example, alternating baffle panels 124 may include a gap between a lower edge 154 of the baffle panel 124 and the bottom surface 126 of the mixing chamber 106. In some implementations, the gap may be between about 2 inches and about 6 inches. The remaining baffle panels 124 extend to the bottom surface 126. In this arrangement, each baffle panel 124 pair has one baffle panel 124 that extends to the bottom surface 126 and one that defines a gap, with the gap alternating from side-to-side of the central dividing wall 152 for each pair distributed along the length of the central dividing wall 152. The central dividing wall includes a plurality of openings 130 defined along its length, which fluidly couple adjacent columns. In some implementations, each of the plurality of openings 130 is covered with a screen (e.g., a 3/16 inch screen). Together, the openings 130 and the alternating gaps defined by the plurality of baffle panels 124 define a serpentine flow path, creating a turbulent flow through the mixing chamber 106. In some implementations, the top exterior surface 110 of the mixing chamber 106 includes weep holes 174 (of about 3/8 inch in diameter) above each column that allow for pressure relief in the mixing chamber 106. The turbulent flow established by the circulation through the mixing chamber may help to dissolve tiny ozone bubbles produced by the injector 136 in order to promote the interaction of ozone with residual materials in the greywater effluent received from an aerobic digester. The ozone dosing quickly cleans the greywater so it can be reused by any of the water requiring functions on the machine, such as the grinding apparatus.

Figure 2:
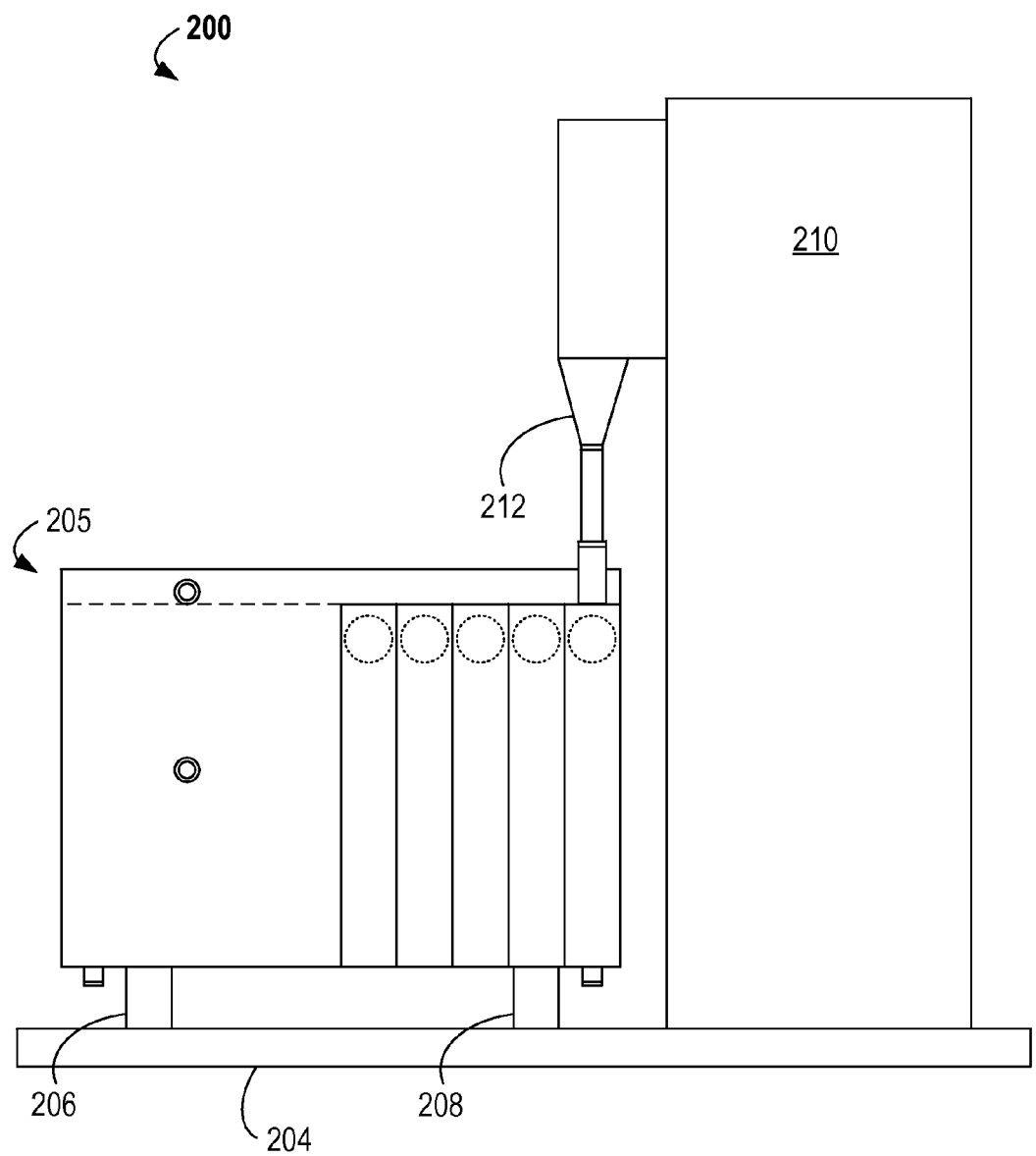
FIG. 2 is a depiction of a food waste management system according to an implementation.

FIG. 2 is a depiction of a food waste management system 200 according to an implementation. The system 200 includes a water treatment tank 205, which may be the same or similar to the water treatment tank 100 described with respect to FIGS. 1A-C. The water treatment tank 205 may be mounted to a support 204 via mounts 206, 208, which may provide space for a recirculation line and related components (e.g., recirculation line 132 described with respect to FIG. 1A) to be fluidly coupled to the water treatment tank 205. An food waste digester 210 (which may be an aerobic food waste digester) is fluidly coupled to the water treatment tank 205 via a drain 212, that allows residual greywater (which may be produced as a byproduct of processing a food slurry) to flow into the water recycler. In general, greywater from the food waste digester 210 is lower in biochemical oxygen demand (BOD) and total suspended solids (TSS), as well as clearer in appearance, than the food waste slurry. The water treatment tank 205 cleans this water using ozone gas, and may provide the cleaned water to other components of the food waste management system (e.g., a grinding apparatus that may be separate from the food waste digester 210 or incorporated within the food waste digester 210), to a sewer, or to any other suitable location for which cleaned greywater may be used. It is noted that system 200 is an illustrative implementation, and variations of and additions to the system 200 would be appreciated by those of ordinary skill in the art.

When operating any of the components of the device that utilize water, a volume of ozone-treated greywater may be flowed out from the water recycling tank. Any water used may eventually end up in the aerobic digester, and may flow back into the water treatment tank 205 to be recycled. Excess volume from food waste may ultimately discharge to a sewer from the water recycler after having been ozone-treated. The lost liquid volume can be replaced by water in the food waste that flows into the water treatment tank 205 from the food waste digester 210. In such implementations, the system 200 operates as a closed loop system, with little to no water being added from external sources (e.g., fresh water), which may reduce costs associated with utilizing water sources and with waste water treatment and removal. Implementations of the system 200 also provide the added advantage of cleaning and deodorizing various components of the system 200, such as a grinding apparatus, due to the nature of the ozone molecule when dissolved in water. Moreover, dissolved oxygen is a byproduct of ozone after it has broken down, thus increasing dissolved oxygen available for aerobic digestion.

Figure 3:
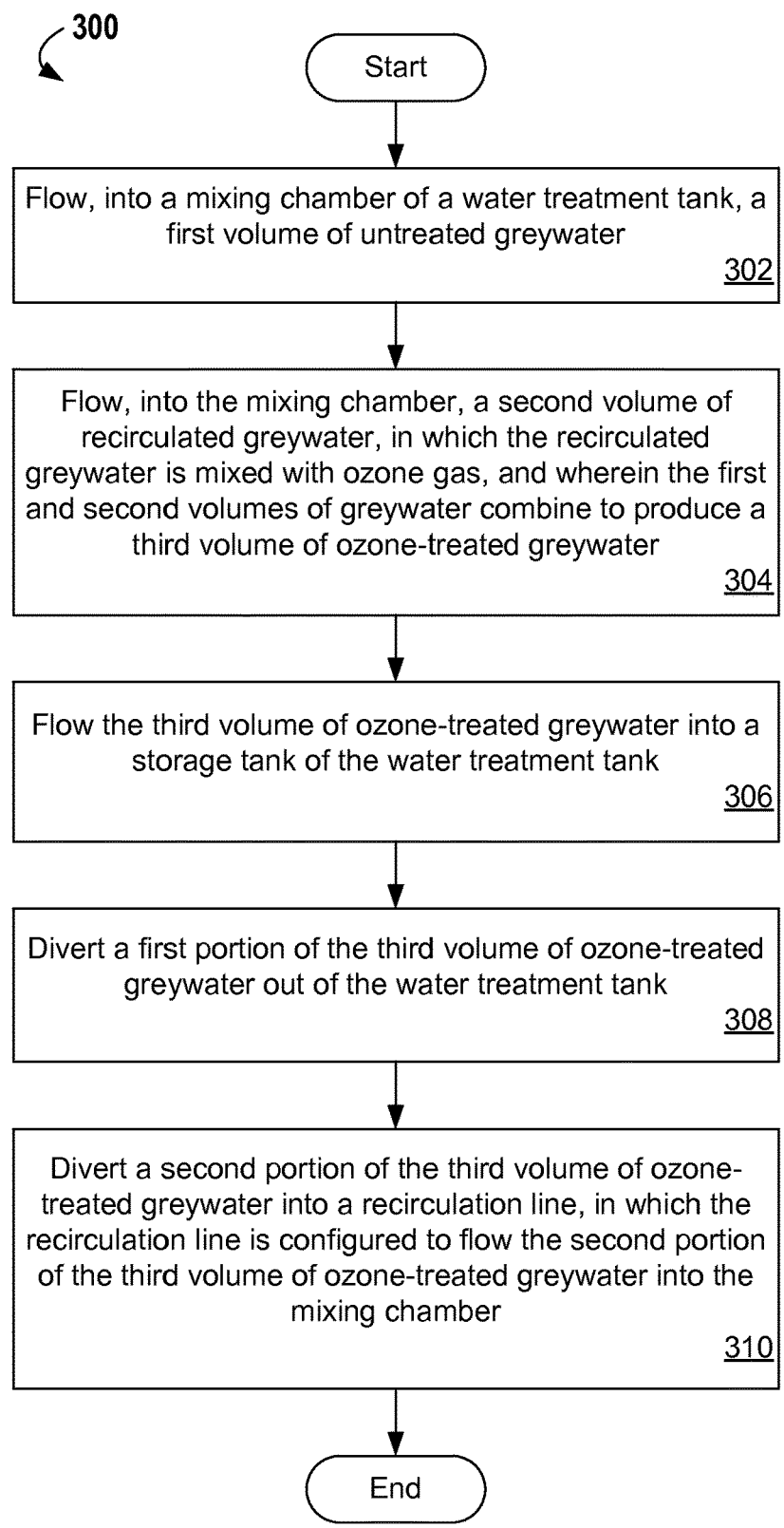
FIG. 3 is a flow diagram of a process for cleaning greywater according to an implementation.

FIG. 3 is a flow diagram of a process 300 for cleaning greywater according to an implementation. In order to provide examples of components used to carry out process 300, reference will be made to components described with respect to FIGS. 1 and 2.

At block 302, a first volume of untreated greywater is flowed into a mixing chamber of a water treatment tank (e.g., mixing chamber 106 of water treatment tank 100). For example, the greywater may be the byproduct of a microbial food decomposition process, and received from a food waste digester (e.g., food waste digester 210). In some implementations, the greywater may be gravity fed into an inlet of the mixing chamber (e.g., inlet 122 of mixing chamber 106).

At block 304, a second volume of recirculated waste water is flowed into the mixing chamber (e.g., via recirculation inlet 128). The recirculated waste water is mixed with ozone gas, and may be mixed with ozone gas prior to entering the mixing chamber (e.g., using injector 136 of recirculation line 132). The first and second volumes of greywater combine within the mixing chamber to produce a third volume of ozone-treated greywater. For example, the first and second volumes of greywater may mix together in a serpentine flow path to produce a turbulent flow. The turbulent flow can cause bubbles of ozone to dissolve into the volume to produce a more homogeneous ozone gas distribution within the combined third volume of ozone-treated greywater.

At block 306, the third volume of ozone-treated greywater is flowed into a storage tank of the water treatment tank (e.g., storage chamber 104). The storage tank may hold the third volume of ozone-treated greywater, and may divert portions of it to other locations and/or devices (e.g., via recirculation outlet 120, feed outlet 116, and/or overflow outlet 112).

At block 308, a first portion of the third volume of ozone-treated greywater is diverted out of the water treatment tank. For example, a feed outlet (e.g., feed outlet 116) located within the storage chamber may provide a flow path for the first portion of the third volume (or any of the volume of the storage chamber) out of the water treatment tank.

At block 310, a second portion of the third volume of ozone-treated greywater is diverted into a recirculation line (e.g., recirculation line 132), which is configured to flow the second portion of the third volume of ozone-treated greywater into the mixing chamber. In some implementations, the third volume of ozone-treated greywater may be mixed with ozone as it is flowed through the recirculation line.

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

Reference throughout this specification to "one implementation" or "an implementation" indicates that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." When the term "about" or "approximately"

is used herein, this is intended to mean that the nominal value presented is precise within ±10%.

The present disclosure is not to be limited in scope by the specific implementations disclosed, and the examples are intended as illustrations. Any implementation described is functionally equivalent within the scope of this disclosure. Indeed, various modifications of the present implementations in addition to those shown and described herein will become apparent to those skilled in the art and are intended to fall within the scope of the appended claims.

What is claimed is:

1. A water treatment tank, comprising:
   a storage chamber; and
   a mixing chamber fluidly coupled to the storage chamber, the mixing chamber having a first inlet disposed on a top surface of the mixing chamber, and a second inlet disposed on a first bottom surface of the mixing chamber, wherein the first inlet is configured to receive greywater from an aerobic food waste digester, and the second inlet is configured to receive recirculated greywater from the storage chamber;
   wherein the mixing chamber includes a central dividing wall disposed between the top surface and the bottom surface and dividing the mixing chamber into two volumes;
   wherein the mixing chamber includes a plurality of baffle panels, each of the plurality of baffle panels bisecting the central dividing wall; and
   wherein the central dividing wall includes a plurality of openings, wherein the plurality of openings together with the plurality of baffle panels define a serpentine flow path within the mixing chamber.

2. The water treatment tank of claim 1, further comprising:
   a plurality of weep holes disposed along the top surface of the mixing chamber.

3. The water treatment tank of claim 1, further comprising:
   an overflow drain disposed along a sidewall of the storage chamber, wherein the overflow drain defines a maximum volume fill line of the storage chamber.

4. The water treatment tank of claim 3, wherein the top surface of the mixing chamber is disposed at a similar height with the fill line of the storage chamber.

5. A water treatment system comprising:
   the water treatment tank of claim 1;
   an aerobic food digester fluidly coupled to the first inlet of the mixing chamber of the water treatment tank; and
   an ozone gas source fluidly coupled to the second inlet of the mixing chamber of the water treatment tank.

6. The water treatment tank of claim 1, further comprising:
   a first outlet disposed along an interior sidewall of the storage chamber, wherein the first outlet is configured to flow fluid stored in the storage chamber outside of the water treatment tank.

7. The water treatment tank of claim 1, further comprising:
   a second outlet disposed along a bottom surface of the storage chamber, wherein the second outlet is fluidly coupled to the second inlet via a recirculation line.

8. The water treatment tank of claim 7, wherein the recirculation line comprises a venturi injector configured to introduce a flow of ozone gas into the recirculation line.

* * * * *